United States Patent
Ohki et al.

(10) Patent No.: US 10,457,582 B1
(45) Date of Patent: Oct. 29, 2019

(54) SYSTEM AND METHOD FOR WASTEWATER TREATMENT THROUGH CONTROLLING PURIFICATION FUNCTIONS OF MICROORGANISMS BASED ON ACTIVATED SLUDGE PROCESS

(71) Applicants: Akiyoshi Ohki, Shirasato (JP); Whitney Rich, Minato-ku (JP)

(72) Inventors: Akiyoshi Ohki, Shirasato (JP); Whitney Rich, Minato-ku (JP)

( * ) Notice: Subject to any disclaimer, the term of this patent is extended or adjusted under 35 U.S.C. 154(b) by 0 days.

(21) Appl. No.: 16/517,637

(22) Filed: Jul. 21, 2019

Related U.S. Application Data

(63) Continuation-in-part of application No. 16/236,190, filed on Dec. 28, 2018, which is a continuation of
(Continued)

(51) Int. Cl.
C02F 3/26 (2006.01)
B01F 11/02 (2006.01)
(Continued)

(52) U.S. Cl.
CPC .......... *C02F 3/26* (2013.01); *B01F 11/02* (2013.01); *C02F 3/1221* (2013.01); *C02F 3/20* (2013.01);
(Continued)

(58) Field of Classification Search
CPC .... B01F 11/02; B01F 2215/0052; C02F 1/34; C02F 1/36; C02F 1/78; C02F 2201/782;
(Continued)

(56) References Cited

U.S. PATENT DOCUMENTS

| 7,105,092 B2 | 9/2006 | Chiba |
| 7,534,351 B2 | 5/2009 | Chiba |

(Continued)

FOREIGN PATENT DOCUMENTS

| JP | 2000033393 A | * | 2/2000 |
| JP | 2008173628 | | 7/2008 |

OTHER PUBLICATIONS

OHR Mixer<http://www.ohr-labo.com/en/mixer.html>(Web page cached on Aug. 16, 2018).
(Continued)

*Primary Examiner* — Terry K Cecil
(74) *Attorney, Agent, or Firm* — Leonid Kisselev

(57) ABSTRACT

Increased control and efficiency over the wastewater purification can be achieved through creating conditions that allow selective prioritization of the digestive function of microorganisms in the activated sludge. The gas-dispersion return sludge is created using pure oxygen or oxygen containing trace amounts of ozone as a reactive gas, which is blended with return sludge to create a mixture of gas and liquid, which is passed through an atomizer or a cavitation pump to instantly render the reactive gas in the mixture to an ultra-fine bubble state. At least a portion of the ultra-fine bubbles dissolve within the gas-dispersion return sludge, activating the dormant microorganisms. Due to a complete or an almost complete absence of digestable organic material in the gas-dispersion return sludge, the microorganisms prioritize their digestive function, and when exposed to organic pollutants present in wastewater, digest the pollutants into water and carbon dioxide at an increased rate.

20 Claims, 5 Drawing Sheets

Related U.S. Application Data application No. 15/956,631, filed on Apr. 18, 2018, now Pat. No. 10,167,214.

(51) Int. Cl.
*C02F 3/20* (2006.01)
*C02F 3/28* (2006.01)
*C02F 3/12* (2006.01)
C02F 3/00 (2006.01)
C02F 1/34 (2006.01)
C02F 1/36 (2006.01)

(52) U.S. Cl.
CPC ........ *C02F 3/28* (2013.01); *B01F 2215/0052* (2013.01); *C02F 1/34* (2013.01); *C02F 1/36* (2013.01); *C02F 3/006* (2013.01); *C02F 2201/782* (2013.01)

(58) Field of Classification Search
CPC ............ C02F 2209/006; C02F 2303/26; C02F 3/006; C02F 3/1221; C02F 3/20; C02F 3/26; C02F 3/28; C02F 3/30
See application file for complete search history.

(56) References Cited

U.S. PATENT DOCUMENTS

| | | |
|---|---|---|
| 2002/0053537 A1 | 5/2002 | Lucido |
| 2008/0105614 A1* | 5/2008 | Fabiyi ................... C02F 3/12 210/625 |
| 2010/0276820 A1 | 11/2010 | Mogami |
| 2013/0140231 A1 | 6/2013 | Novak et al. |
| 2015/0175461 A1 | 6/2015 | Leonard |
| 2017/0113957 A1 | 4/2017 | Eckelberry |
| 2017/0152168 A1 | 6/2017 | Cloete et al. |

OTHER PUBLICATIONS

Takafumi Kawamura, "Shadowgraph Analysis of Atomizer Microbubbling Effect" Tokyo University Graduate School of Engineering Faculty of Environmental and Marine Technology (Feb. 2005).

\* cited by examiner

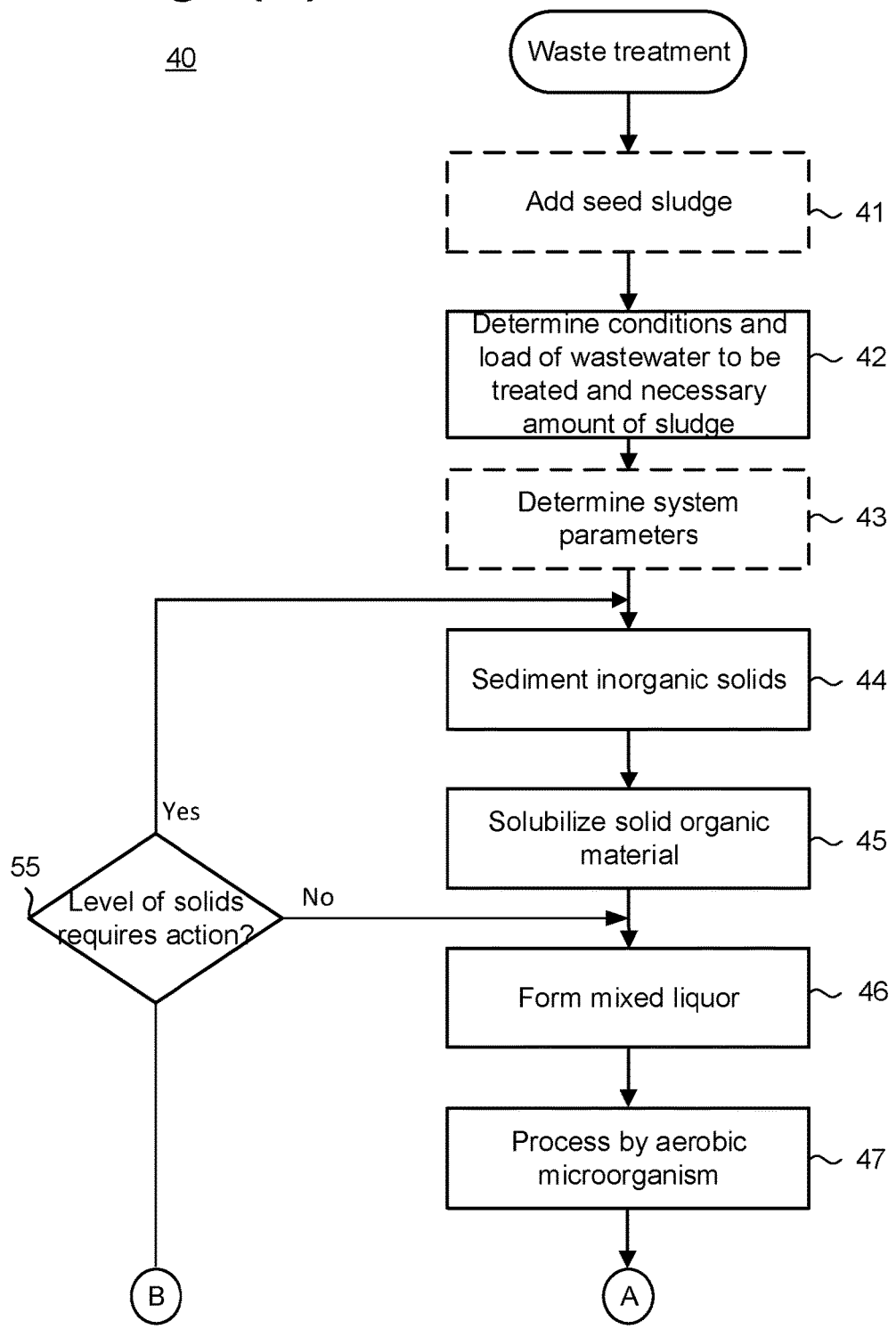

60

SYSTEM AND METHOD FOR WASTEWATER TREATMENT THROUGH CONTROLLING PURIFICATION FUNCTIONS OF MICROORGANISMS BASED ON ACTIVATED SLUDGE PROCESS

CROSS-REFERENCE TO RELATED APPLICATION

This patent application is a continuation-in-part of U.S. patent application Ser. No. 16/236,190, filed Dec. 28, 2018, pending, which is a continuation of U.S. Pat. No. 10,167, 214, issued Jan. 1, 2019, the priority dates of which are claimed and the disclosures of which are incorporated by reference.

FIELD

The present invention relates in general to wastewater purification, and in particular, to a system and method for wastewater treatment through controlling microorganism purification functions based on an activated sludge process.

BACKGROUND

The activated sludge method is employed widely today for the purification of wastewater. The activated sludge method is a biochemical treatment and oxidation process which employs microorganisms and oxygen to immobilize organic pollutant substances which are dissolved in wastewater into activated sludge utilizing the reproductive function of the sludge, and then utilizes the digestive function of the sludge to break down a portion of the organic pollutants into water ($H_2O$) and carbon dioxide gas ($CO_2$) for removal.

The typical activated sludge wastewater treatment techniques have over a century of history and many challenges are associated with such traditional techniques. For instance, the biochemical cleansing of organic pollutant substances depends largely on the quantity of microorganisms (return sludge), the density of the microorganisms, and the degree of their activity. However, to increase the quantity of microorganisms, their density, and their activity, increasing the supply of dissolved oxygen, which is essential to the microorganisms, is necessary. Without adequate supply of dissolved oxygen, the wastewater treatment may not be effective.

When the activated sludge method is employed under natural environmental conditions, namely, at 20° C. under standard pressure, 1DO (mg/L) of dissolved oxygen is required to purify 1 BOD (biochemical oxygen demand in mg/L) of organic pollutants in a five-day period. Similarly, 1DO (mg/L) of dissolved oxygen is required to purify 1COD (chemical oxygen demand in mg/L) of organic pollutants at 20° C. under standard pressure in a 30-minute to two-hour period. Therefore, under standard environmental conditions, the purification processing performance of the standard activated sludge method does not exceed 1BOD per 1DO, and in the same way, 1DO is required to purify 1COD. In other words, to purify either 1BOD of pollutant or 1COD of pollutant, 1DO of dissolved oxygen is required. As for the time required, 1BOD of pollutant require five days and 1COD of pollutant requires 30 minutes to two hours.

While many enhancements and improvements have been proposed to traditional activated sludge-based wastewater treatment, most of them presume conditions which exist naturally in the environment. To date, no innovative technology or method that brings about a revolutionary improvement in performance has been proposed.

The activated sludge method employs microbes and oxygen to effect a biochemical treatment and oxidation, isolating organic pollutants in the wastewater in the form of activated sludge, so that a portion the organic pollutants can be broken down to water ($H_2O$) and carbon dioxide gas ($CO_2$) for removal. For this reason, the biochemical purification of the organic pollutants depends greatly upon the quantity of return sludge (microbe flora), the density of the microbe flora, and the degree to which the microbe flora is activated.

One enhancement to traditional activated sludge-based wastewater treatment is known as "preliminary aeration." When preliminary aeration is used, the return sludge is aerated in advance, and the return sludge (microbe flora) thus activated is supplied to an aeration vessel. However, the capacity enhancement from preliminary aeration is limited to about 30%, and due to this low improvement ratio the cost of aeration is immense. The additional cost of aeration is roughly 100%, so for a 30% improvement in performance the cost is doubled, which is clearly not cost-effective.

Similarly, another technique used today is long-term continuous aeration bubbling technology, in which the wastewater to be purified and a return activated sludge are combined in an aeration basin into a mixed liquor. Air is provided through a blower into the aeration basin. Bubbles of about 1 mm are produced, aerating the mixed liquor so that the air is dissolved into the wastewater, providing oxygen for aerobic microorganisms and activating them so they can break down organic solids in the wastewater more efficiently. However, as oxygen is not easily soluble, even with the bubbling, the achieved concentration of dissolved oxygen is not high enough to bring about a large increase in microorganisms, generally being 2-4 mg/l, a level similar to what is observed in nature, such as in rivers and lakes. While a greater number of microorganisms can be provided by increasing the amount of return sludge inserted into the aeration basin, to be effective, the increase would have to be accompanied by increasing the supply of available oxygen, which may not be possible without physically changing the existing setup. Further, currently any changes to the existing set-up, including the size and production capacity of any source of oxygen, would most likely involve guesswork as to what changes would be sufficient to provide the required oxygen, with no precise relationship between the amount of oxygen provided and the amount of contaminants removed being known.

Likewise, U.S. Pat. No. 7,105,092, issued Sep. 12, 2006, to Kousuke Chiba ("'092 patent"), the disclosure of which is incorporated by reference, discloses a sewage treatment process by which activated-sludge method comprising line atomizing treatment. Wastewater is introduced into the treatment line. The wastewater passes through the adjustment vessel and the sedimentation vessel where inorganic pollutant substances are removed. Subsequently, the wastewater enters the anaerobic reaction vessel where the wastewater is acted upon by anaerobic microorganisms. Subsequently, the wastewater enters the aerobic reactive vessel where organic matter within the wastewater is converted into activated sludge by the action of aerobic microorganisms. After the conversion process in the aerobic reaction vessel, the treated wastewater solution which has had the dissolved organic matter converted into activated sludge is sent together with the activated sludge to the sludge sedimentation vessel, and the supernatant water is expelled from the wastewater treatment system. The supernatant water may also be subjected to advanced treatment for further purification.

The '092 patent further discloses that a portion of the activated sludge which has settled in the sludge sedimentation vessel passes through the sludge intake pipe and is supplied respectively as return sludge to the adjustment vessel, sedimentation vessel, anaerobic reactive vessel, aerobic reactive vessel, and sludge sedimentation vessel to effect multiple functionality for each of those vessels, and to enhance the treatment capacity of the wastewater system while allowing the remainder of the activated sludge to undergo separate treatment as excess sludge. However, each vessel has an original function and role, and in many cases, adding activated return sludge which holds large quantities of reactive gases (oxygen or oxygen with trace amounts of ozone) may interfere with those functions or roles, thus decreasing the effectiveness of wastewater treatment.

Further, the cleansing of wastewater depends fundamentally on the activity of microorganisms (activated sludge), and is thus saddled with the problem of the formation of excess sludge due to the excessive reproduction of these microorganisms, and technology to control this excess has not yet adequately been realized. In other words, the microorganisms which are involved in the cleansing of wastewater are constantly reproducing themselves and then perishing due to self-oxidization, hence controlling and managing the amount of sludge produced and the amount destroyed is extremely difficult, and the lack of this control and management is considered the critical problem of the activated sludge method. As a result, the large quantities of excess sludge that form are concentrated, transported and incinerated or buried in landfills, causing massive processing costs for the removal of excess sludge and emissions problems from the release of carbon dioxide during incineration.

In the activated sludge method, the activated sludge, that is, the microbe flora, which purifies the organic pollutants in the wastewater, can be considered to be purifying primarily through the following functions: the reproductive function, where the microbe flora absorbs organic matter as food, the flora grows and multiplies, and the organic matter is isolated in the form of a clump of microbes; and the digestive function, where the microbe flora absorbs organic matter as food, and digests the food to release energy which it uses to stay alive and carry out its life processes. To efficiently purify the organic matter in wastewater, there is an essential need for the sludge be activated, but under normal environmental conditions, the entire microbe flora is activated and controlling or managing the digestive and reproductive functions separately is impossible. Under normal conditions, the reproductive function is liable to increase, creating large quantities of excess sludge. To purify organic matter efficiently, bringing these two functions into balance is necessary. Accordingly, there is a need to be able to control and manage both digestive and reproductive functions separately.

In the activated sludge method, the wastewater purification capacity is fundamentally dependent upon the activity of the microbe flora (activated sludge). For this reason, while having the microbes activated is indispensable for increasing the wastewater purification capacity, wastewater purification techniques that simply activate in a directionless fashion result in excess reproduction, bringing about the problems of excess sludge which are among the most fundamental issues with the activated sludge method. Typically, the large quantities of excess sludge generated are concentrated, removed, incinerated, or buried, causing many problems such as very high disposal costs and the release of large quantities of $CO_2$ into the environment.

However, there is a lack of technology available today that can handle these issues. Specifically, the microbe flora goes through a constant cycle of growing through reproduction but then extinction of the microbes by digestion, and the effective separate control and management of the growth and extinction of microbe flora as caused by these two functions is considered an extremely difficult problem.

Accordingly, there is a need for a way to control the purifying function of the microbe flora of activated sludge such that the purifying effect can be utilized technologically and industrially.

SUMMARY

The system and method described below, firstly, enable separate control and management of the reproductive function and the digestive function of the microbes which are the key factors in the activated sludge-based wastewater treatment, thereby limiting the production of excess sludge. Secondly, whereas in the activated sludge method 1DO is defined as the unit of purifying 1BOD or 1COD, the system and method described below, by limiting the reproductive function and enhancing the digestive function, allows the purification of a far greater quantity of organic matter than in the traditional method where no more than 1BOD or 1COD can be purified with 1DO of dissolved oxygen. Thirdly, the system and method described below allow the individual control and management of the reproductive and digestive function in the activated sludge-based wastewater treatments. Fourthly, the system and method described below can be easily and inexpensively fitted to the activated sludge-based wastewater treatment facilities currently in use throughout the world.

The system and method described below focus on the digestive function of microbe flora which absorbs organic matter as food and break the organic down for sustenance and life energy, and cause the microbe flora to exhibit the digestive function more than the reproductive function by creating or providing a starvation environment which is not dependent upon the respective quantities of microbes and food. In particular, the system and method described below create conditions that do not exist in nature to activate the microbe flora to a high degree, providing an extreme starvation environment, spurring the microbes to exhibit the digestive function over the reproductive function, such that the quantity of organic matter which can be digested with 1DO is far greater than the 1BOD or 1COD which was the maximum attainable in the traditional activated sludge-based purification. Thus, by creating or providing conditions which do not exist in nature, the system and method described below stimulate strongly and to a high degree the activated sludge (microbe flora) which purify the organic matter in wastewater, separately controlling and maintaining the reproductive function and the digestive function which the microbes possess, thereby yielding an effect which is revolutionary and unimaginable in nature.

Some of the features of the system and method described below can include: using pure oxygen ($O_2$) or oxygen with a trace amount of ozone ($O_3$) (e.g. less than 0.5 mg/L of sludge) as a reactive gas; super-saturating the return sludge with pure oxygen (at least DO 10 mg/L); dissolving trace amounts of ozone (less than 0.5 mg/L) in the return sludge; supplying to the aerobic reaction vessel return sludge with pure oxygen or the oxygen/ozone mixture in the quantity equal to at least 10% of the wastewater to be treated; and activating the entire microbe flora (all of the return activated sludge).

By providing these features, individually or in a group (including providing all of the conditions), the microbe flora is activated. The activation takes place when the organic matter which serves as food to the microbes is cut off. When the activated microbe flora reaches an extreme state near the point of starvation, the microbes begin to absorb organic matter to the limit of their capacity, regardless of the quantity of food or the quantity of microbes, and they prioritize their digestive function. The extreme state near the point of starvation here refers to a state in which the microbes, having been activated to a high degree, enter a state of extreme starvation, pushing them to the point where they become desperate for food, after which they suddenly encounter food (in the form of a mixture of return sludge and wastewater). As a result, the reproductive function of the microbes becomes suppressed and the production of large quantities of excess sludge is prevented. Specifically, by forcing the microbes into a near-starvation situation, it is possible to control and monitor the functions which the microbes naturally possess. In particular, the use of the system and method below allows to cause the cause the microbes to prioritize digestion over reproduction, which suppresses the production of excess sludge.

Further, because the microbes are activated strongly by the introduction of reactive gas into the Gas-Dispersion Return sludge, a high level of preliminary aeration can observed, and wastewater treatment capacity is dramatically enhanced. As a result of the enhanced wastewater treatment capacity, use of a far smaller aerobic reaction vessel becomes possible, eliminating the high-cost, energy-wasting processes of bubbling and churning which are necessitated in the conventional activated-sludge based techniques because of the poor water solubility of oxygen. Further, due to the microbe flora being activated to a high degree under environmental conditions which do not exist in nature, wastewater purification can be achieved with a much greater efficiency and in a far shorter time than in the conventional activated sludge method in which organic matter is defined in terms of BODs and CODs.

The system and method described below can be implemented on any existing wastewater treatment facility easily and with very small investment, and can be retrofitted, and can provide industrial energy savings and economic benefit on a global scale. In particular, the system and method allow to solve the problem of the huge expenditures on energy for inefficient bubbling of insoluble air used as reactive gas, as well as the requirement for gigantic aeration facilities, and the problem of the production of large amounts of excess sludge during wastewater purification can be solved simultaneously, with a potential to bring about a massive economic effect to the entire world. Further, as world population is rapidly concentrating in cities, this invention allows for the rebirth of the activated sludge-based as a low-cost, high-efficiency, low-energy-consuming urban infrastructure technology.

In one embodiment, a system and method for wastewater treatment through controlled prioritization of microorganism digestion function are provided. A return sludge is provided that includes aerobic microorganisms capable of exhibiting at least one of a reproductive function, by which the microorganisms absorb organic pollutants and multiply using the absorbed pollutants, and a digestive function, by which the microorganisms digest the organic pollutants as a source of energy into water and carbon dioxide, wherein the return sludge is substantially free of the organic pollutants and wherein at least a majority of the microorganisms are in a dormant state when provided. Using a gas generator, at least one reactive gas is provided into the return sludge. A gas-dispersion return sludge is formed by rendering using one of an atomizer or a cavitation pump the at least one reactive gas into ultra-fine bubbles within the return sludge, wherein a portion of the ultra-fine bubbles dissolves within the return sludge, wherein the at least one dissolved reactive gas activates at least a portion of the dormant microorganisms, and wherein the gas-dispersion return sludge is substantially free of the organic pollutants. A mixed liquor is formed by combining the gas-dispersion return sludge with a wastewater that includes at least some of the organic pollutants, wherein the activated microorganism prioritize the digestive function over the reproductive function upon encountering the organic pollutants within the wastewater.

In a further embodiment, a system and method for wastewater treatment through controlling microorganism purification functions are provided. A sludge is provided that includes aerobic microorganisms capable of exhibiting at least one of a reproductive function, by which the microorganisms absorb organic pollutants and multiply using the absorbed pollutants to produce the sludge, and a digestive function by which the microorganisms digest organic pollutants as a source of energy into water and carbon dioxide, wherein the sludge is substantially free of the organic pollutants and wherein at least a majority of the microorganisms are in a dormant state when provided. Using a gas generator, at least one reactive gas is provided into the sludge. A gas-dispersion return sludge is formed by rendering using one of an atomizer or a cavitation pump the at least one reactive gas into ultra-fine bubbles within the sludge, wherein a portion of the ultra-fine bubbles dissolves within the sludge, wherein the at least one dissolved reactive gas activates at least a portion of the dormant microorganisms, and wherein the gas-dispersion return sludge is substantially free of the organic pollutants. An amount of the sludge to be produced by the microorganism is set. A ratio of a volume of wastewater including at least some of the organic pollutants to a volume of the gas-dispersion return sludge necessary to produce the amount of the sludge is determined. A mixed liquor is formed by combining the gas-dispersion return sludge with the wastewater in accordance with the ratio, wherein the microorganisms prioritize one of the digestive or the reproduction function based on an availability of the organic pollutants in the mixed liquor.

In a still further embodiment, a system and method for optimization of wastewater treatment through controlling microorganism purification functions are provided. A sludge is provided that includes aerobic microorganisms capable of exhibiting at least one of a reproductive function, by which the microorganisms absorb organic pollutants and multiply using the absorbed pollutants to produce the sludge, and a digestive function by which the microorganisms digest organic pollutants as a source of energy into water and carbon dioxide, wherein the sludge is substantially free of the organic pollutants and wherein at least a majority of the microorganisms are in a dormant state when provided. Using a gas generator, at least one reactive gas is provided into the sludge. A gas-dispersion return sludge is formed by rendering using one of an atomizer or a cavitation pump the at least one reactive gas into ultra-fine bubbles within the sludge, wherein a portion of the ultra-fine bubbles dissolves within the sludge, wherein the at least one dissolved reactive gas activates at least a portion of the dormant microorganisms, and wherein the gas-dispersion return sludge is substantially free of the organic pollutants. A mixed liquor is formed by combining a volume of the gas-dispersion return sludge with a volume of the wastewater. The mixed liquor is pumped into a sludge sedimentation vessel and the mixed liquor is separated into a supernatant and the sludge. An amount of the sludge separated from the mixed liquor is determined, wherein a ratio of the gas-dispersion return sludge to the wastewater is adjusted in forming further batches of the mixed liquor based on the amount of the sludge separated from the mixed liquor.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 2A-2B are flow diagrams showing a method for wastewater treatment through controlled microorganism activation in accordance with one embodiment.

DETAILED DESCRIPTION

Traditionally, the relationship between the amount of oxygen provided to microorganisms and the amount of pollutants in wastewater that those microorganisms can break down using the oxygen has been thought to be linear. Thus, regardless of the overall concentration of oxygen, 1DO (mg/l) has been thought to be capable of facilitating the breakdown of 1BOD or 1COD of pollutants. As further described below, at high oxygen concentrations achievable through the use of the system and method described below, that relationship is no longer linear, and the achievable wastewater purification effect far exceeds the effect achievable with activated sludge-based purification when oxygen remains at a level seen in nature (2-4 mg/l). This effect increases the rate at which wastewater can be purified and decreases the cost of such purification.

Figure 1A:
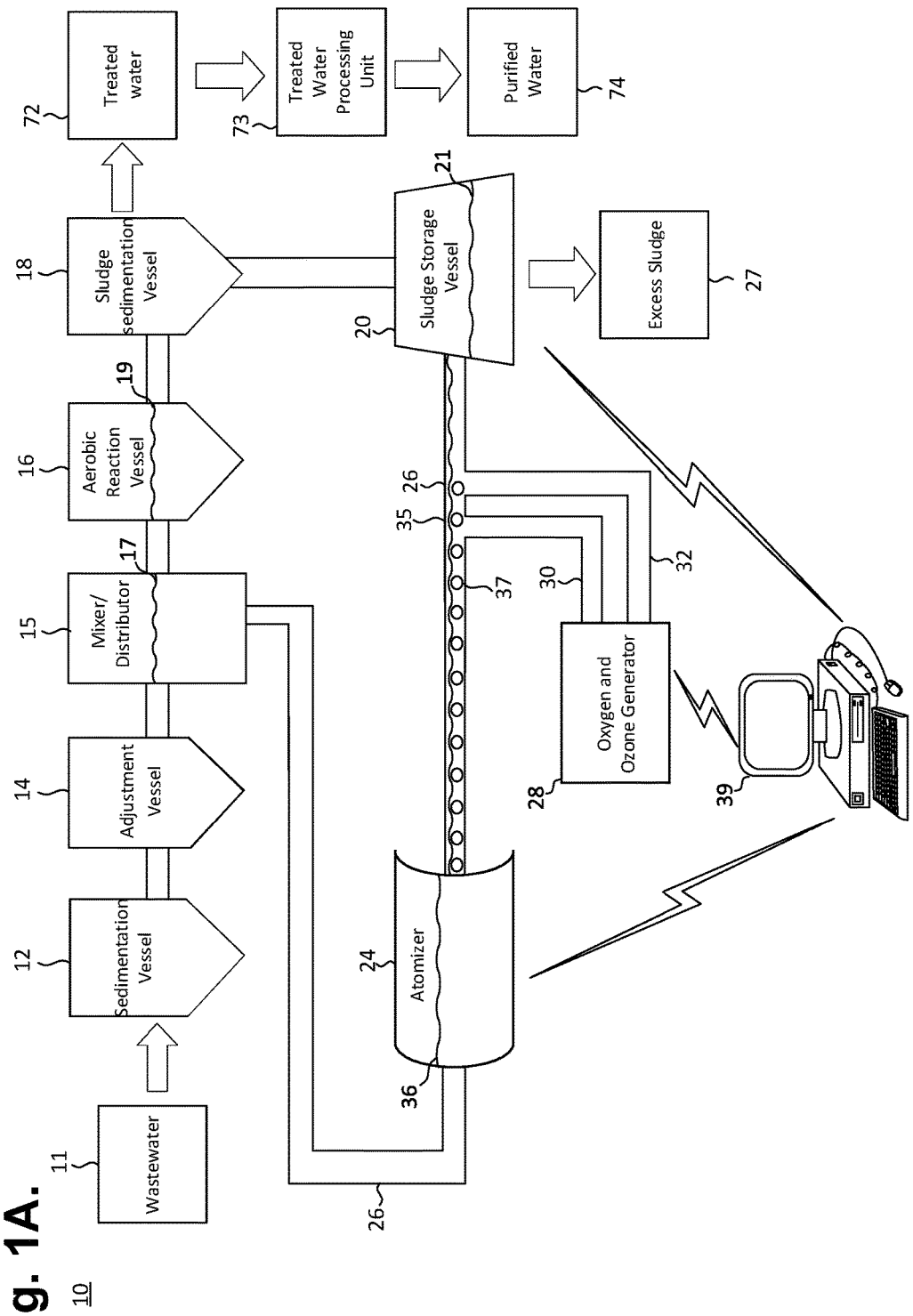
FIGS. 1A-1B are block diagrams showing a system for wastewater treatment through controlled microorganism activation in accordance with two embodiments.
Figure 1B:
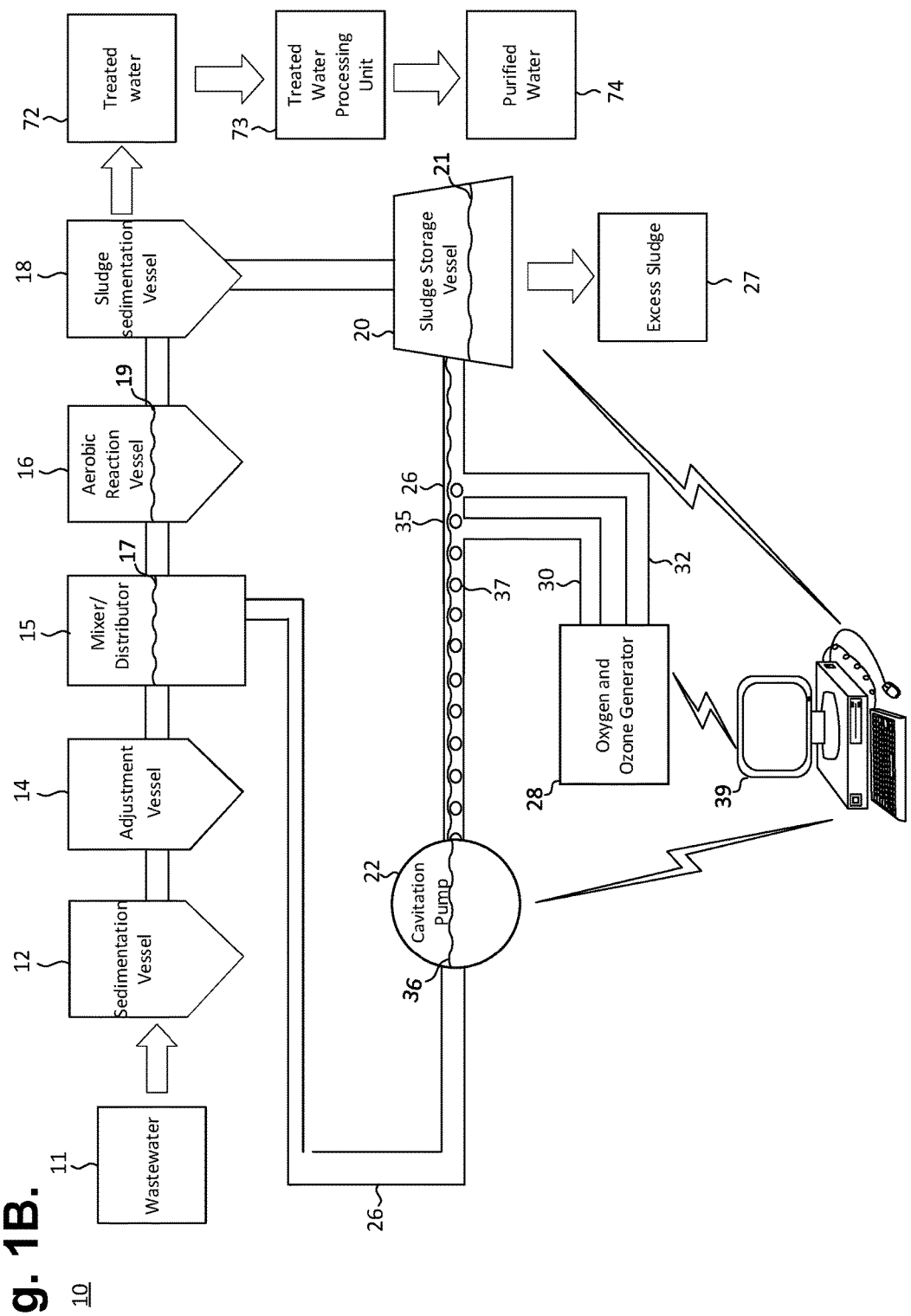

Microorganisms, after being placed in an environment with very little food or a closed environment which causes starvation, can, upon contact with food, exhibit advantageously the digestive abilities or the reproductive abilities. The increase in the purification ability of the microorganisms in the presence of the high level of oxygen is achieved by making the microorganisms prioritize the digestion function over the reproduction function. Microorganisms (also referred to as microbes below), such as bacteria and protozoa, prioritize the digestion function when the amount of available consumable material (such as organic pollutants) is low relative to the microorganism population. On the other hand, when the amount of the consumable material is high relative to the microorganism population, enough to satisfy the energy needs of the existing microorganism population as well as additional population, the reproductive function of the microorganisms is prioritized over the digestive function and the microorganisms reproduce. FIGS. 1A-1B are a block diagrams showing a system 10 for wastewater treatment through controlled microorganism activation in accordance with two embodiments. The system 10 in the embodiment shown with reference to FIG. 1A includes a Sedimentation Vessel (also known as a sediment pool and a grit chamber) 12, an Adjustment Vessel 14, a Mixer/Distributor 15, one or more Aerobic Reaction Vessels (also known as an aeration vessel) 16, a Sludge Sedimentation Vessel 18, a Sludge Storage Vessel 20, an Atomizer 24, and a Treated Water Processing Unit 73. The system 10 shown with reference to FIG. 1B includes a Sedimentation Vessel (also known as a sediment pool and a grit chamber) 12, an Adjustment Vessel 14, a Mixer/Distributor 15, one or more Aerobic Reaction Vessels (also known as an aeration vessel) 16, a Sludge Sedimentation Vessel 18, a Sludge Storage Vessel 20, a Cavitation Pump 22, and a Treated Water Processing Unit 73. In a still further embodiment, the system 10 could include both a Cavitation Pump 22 and the Atomizer 24.

The Sludge Storage Vessel 20 and the one or more Aerobic Reaction Vessels 16 are connected by the Return Sludge Pipeway 26, constructed such that return sludge which has settled in the Sludge Storage Vessel 20 can be supplied to the Mixer/Distributor 15 and eventually to the one or more Aerobic Reaction Vessel 16. The Atomizer 24 or the Cavitation Pump 22 are positioned linearly along the Return Sludge Pipeway 26. Return Sludge 35 which travels through Return Sludge Pipeway 26 is therefore acted on by the Atomizer 24 (in the embodiment of the system 10 shown with reference to FIG. 1A) or the Cavitation Pump (in the embodiment of the system 10 shown with reference to FIG. 1B) and becomes gas-dispersion return sludge 36, which is in turn supplied to the Mixer/Distributor 15 and the one or more Aerobic Reaction Vessel 16 as gas-dispersion return sludge 36.

The system 10 further includes an Oxygen and Ozone Generator 28 that provides at least one reactive gas 37, oxygen with a possible addition of ozone, for addition to the return sludge 35. The Oxygen Supply Pipe 30 and the Ozone Supply Pipe 32 which are connected to the Oxygen and Ozone Generator 28 are connected to one or more pipes that is part of a Return Sludge Pipeway 26 and is in the upstream (intake) side of Atomizer 24 (in the embodiment of the system 10 shown with reference to FIG. 1A) or of the Cavitation Pump 22 (in the embodiment of the system 10 shown with reference to FIG. 1B)

For the Oxygen and Ozone Generator 28, the oxygen and ozone generator in U.S. Pat. No. 7,105,092 may be utilized. Other kinds of generators are possible. In one embodiment, the total amount of gas with produced by the Oxygen and Ozone Generator 28 includes no less than 90% of oxygen, with the concentration of ozone within the gas-dispersion return sludge 36 not exceeding 0.5 mg/L and the concentration of oxygen being more than 10 mg/L.

The Return Sludge Pipeway 26 is connected only to the Mixer/Distributor 15 (and hence to the one or more Aerobic Reaction Vessels 16), and is therefore not connected to Sedimentation Vessel 12, Adjustment Vessel 14, and Sludge Sedimentation Vessel 18. The technological reason for this is discussed below.

Figure 2B:
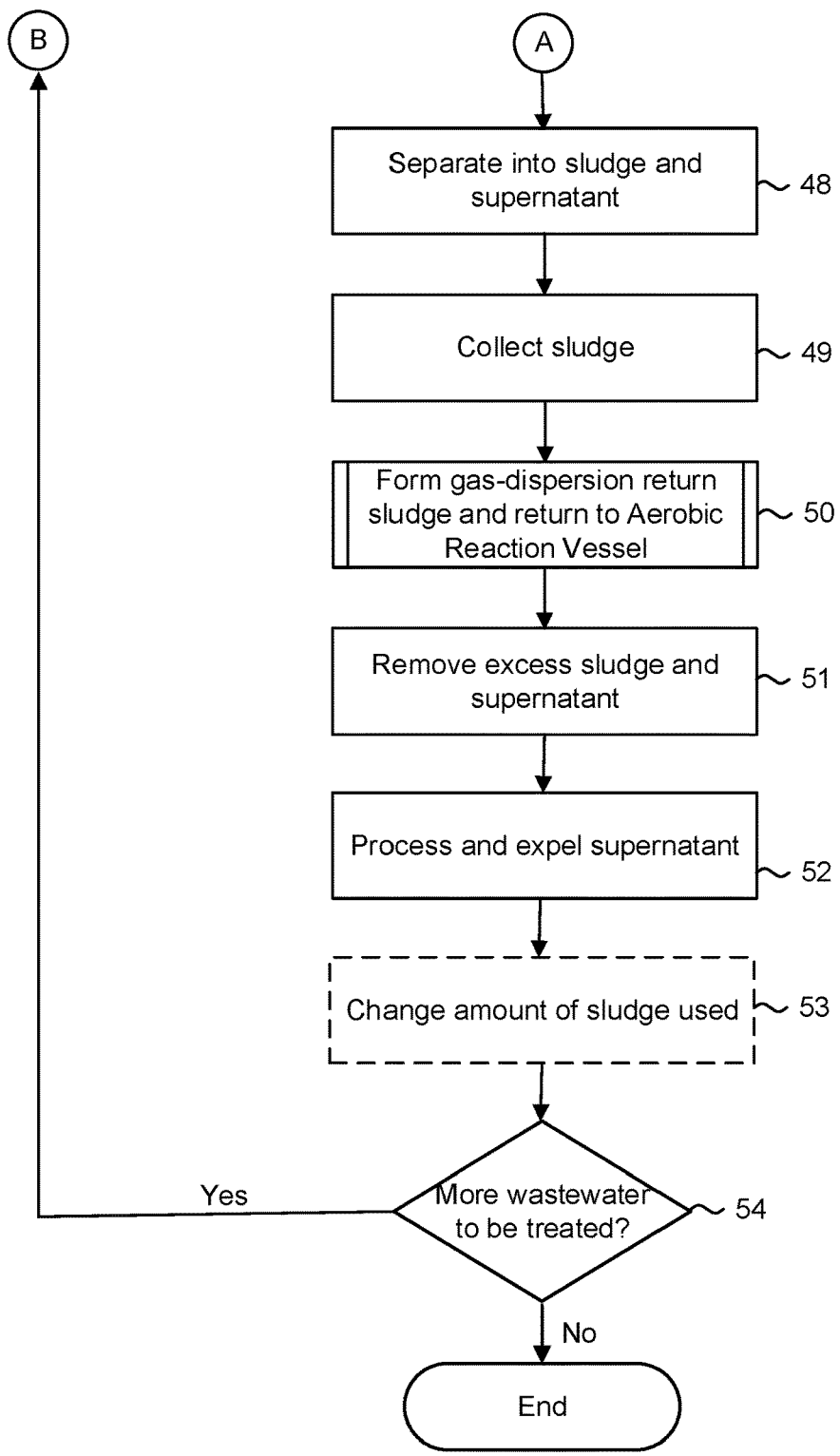

As further described below beginning with reference to FIGS. 2A-2B, the Wastewater for Treatment (raw sewage) 11 enters Sedimentation Vessel 12 where grit and other inorganic solids settle and are separated out. From the Sedimentation Vessel 12, the Wastewater 11 flows into Adjustment Vessel 14 where the load and conditions of the inflowing raw sewage is adjusted, such as through automatic dilution, though other adjustments are possible, and organic solids present in the wastewater are solubilized by anaerobic microorganisms.

From the Adjustment Vessel 14, the Wastewater 11 flows into the Mixer/Distributor 15. The Mixer/Distributor 15 (also referred to as "Mixer" in the description below) receives wastewater 11 supplied from the Adjustment Vessel 14 and also receives gas-dispersion return sludge 36 supplied from via the Return Sludge Pipeway 26, mixes them together and supplies a mixture ("a mixed liquor 17") of gas-dispersion return sludge 36 and wastewater 11 to the one or more Aerobic Reaction Vessels 16. From there, aeration by bubbling using air as a reactive gas becomes unnecessary due to the reactive gas contained in gas-dispersion return sludge 36, which supplies dissolved oxygen (DO) to the Aerobic Reaction Vessel 16 (and initially to the Mixer 15). The Mixer 15 can include such parts as necessary for carrying out this function, such as a vessel for temporarily holding the mixed liquor 17, connections to the Aerobic Reaction Vessels 16, and one or more pumps for pumping the mixed liquor 17 to the one or more Aerobic Reaction Vessels 16. When there are multiple Aerobic Reaction Vessels 16, the Mixer/Distributor 15 can be managed appropriately to distribute to each of them in accordance with the treatment capacity of each. In the event that there is only one Aerobic Reaction Vessel, the Mixer/Distributor 15 can be entirely omitted, with the wastewater 11 and the gas-dispersion return sludge 36 being pumped directly into the Aerobic Reaction Vessel 16, where they form the mixed liquor 17.

As further described below, the microorganism flora in the gas dispersion return sludge 36 has been activated by the oxygen (possibly with a trace of ozone) supplied by the gas generator 28. The gas-dispersion return sludge 36 is either completely devoid of, or has an extremely low level of organic pollutants that can be digested by the activated microorganisms. At such conditions, the microorganisms have been empirically shown to prioritize the digestive function at the expense of the reproductive function, even though the microorganisms have no way to exercise this function at the moment due to a complete or almost complete absence of digestible material. Upon the gas dispersion return sludge 36 being mixed with the wastewater that includes digestable organic pollutants, the microorganisms that have previously been "starved" of the digestable material, start exercising the digestive function at an elevated rate compared to a suppressed reproductive function, thus turning the majority of the organic pollutants into water and carbon dioxide. The prioritizing of the digestive function over the reproductive function continues within the one or more Aerobic Reaction Vessels 16 until the energy requirements of the microorganism have been satisfied, at which point they can also start exercising the reproductive function to produce sludge 21 if any organic pollutants remain in the mixed liquor 17 undigested. Upon complete or substantially complete consumption of the organic pollutants within the mixed liquor, at least a portion of the microorganisms (such as the majority or all of the microorganisms within the mixed liquor) enter a dormant state (in which biochemical processes within the microorganisms are substantially slowed down or halted) due to a lack of further digestable material.

Upon a completion of a hold time, a time that can be experimentally determined to be adequate for the completion of the digestion (and possibly consumption through the reproductive function) of the organic pollutants in the mixed liquor 17, the mixed liquor 17 is pumped from the Aerobic Reaction Vessels 16 to the Sludge Sedimentation Vessel 18, where the mixed liquor 17 is separated into a supernatant and a sludge 21. The sludge 21 is collected in Sludge Storage Vessel 20, and as described further below, is returned to Aerobic Reaction Vessel 16 in the form of gas-dispersion return sludge 36, for cyclical reuse. In a further embodiment, the system 10 can omit the Sludge Storage Vessel 20, and the exit side of Sludge Sedimentation Vessel 18 and the Mixer/Distributor 15 are connected to the Return Sludge Pipeway 26.

The supernatant is pumped out from the Sludge Sedimentation Vessel 18 as Treated Water 72, which in turn is pumped into a Treated Water Processing Unit 73, where the water is further processed. Such processing can include sterilization, such as described in U.S. Pat. No. 10,287,194, filed issued May 14, 2019, to Ohki et al., the disclosure of which is incorporated by reference, though other ways to sterilize the Treated Water 73 is possible. Other processing can be done at the unit 73. While the unit 73 is shown as a single physical structure with reference to FIG. 73, the unit 73 could also be made up of multiple, spatially separated components. The water processed by unit 73 is expelled from the system 10 as Purified Water 74, now being suitable for use, such as drinking.

Additionally, the excess sludge is pumped out of the wastewater management system as Excess Sludge 27.

At least some portion of the sludge from Sludge Sedimentation Vessel 18 passes through the Return Sludge Pipeway 26 in the form of Return Sludge 35, entering the Atomizer 24 (in the embodiment of the system 10 shown with reference to FIG. 1A) or the Cavitation Pump 22 (in the embodiment of the system 10 shown with reference to FIG. 1B). Before the entrance point of the Atomizer Pump 24 or the Cavitation Pump 22, pure oxygen gas or pure oxygen gas with trace amounts of ozone are mixed into Return Sludge 35, forming gas-dispersion return sludge 36.

The creation of the gas-dispersion return sludge 36 is made possible by the use of the Atomizer 24 (in the embodiment of the system 10 shown with reference to FIG. 1A) or the Cavitation Pump 22 (in the embodiment of the system 10 shown with reference to FIG. 1B). In particular, a gas-liquid mixture (a mixture of the at least one reactive gas 37 with the Return Sludge 35) is formed within the Return Sludge Pipeway 26 and is pumped to the Atomizer 24 (in the embodiment of the system 10 shown with reference to FIG. 1A), which has the function of churning and mixing the aforementioned gas-liquid under high pressure (approximately 0.0981-5.394 MPa (1-55 kg/cm$^2$)), then employing either cavitation or 20-12,000 kHz ultrasound respectively or both simultaneously to induce ultra-fine bubbles in the gas-liquid mixture of diameter from 1 nm-30,000 nm, further causing oxygen radicalization and hydroxyl radicalization. A portion of the ultra-fine bubbles dissolve within the gas-dispersion return sludge, raising the level of the dissolved oxygen to the critical threshold of at least 10 mg/l (with the concentration of ozone, if ozone is utilized, being 0.01-0.5 mg/l), and a portion is stored with the sludge 36 as ultra-fine bubbles. Thus, the Atomizer 24 can instantaneously render the desired quantity of reactive gas 37 into ultra-fine bubbles, rapidly dissolving a portion of the reactive gas, then disperse, immobilize and store the excess in a liquid in the form of ultra-fine bubbles. Increasing the level of the dissolved oxygen to the critical threshold (at least 10 mg/l) has been empirically shown to activate the microorganisms within the sludge 36, removing them from the dormant state. While the microorganism are activated at this point and are ready to digest organic pollutants (and are prioritizing the digestive function over the reproductive function), the level of the organic pollutants (or other digestable organic materials) within the gas-dispersion return sludge 36 is either at zero or close to zero (at a level insufficient to satiate the prioritized digestive function of the microorganism), and thus the microorganisms are forced into a state of extreme starvation.

In one embodiment, the Atomizer 24 can be the OHR-Mixer sold by OHR Laboratory Corporation of 536-1, Noda, Irumashi, Saitama 358-0054 Japan. In a further embodiment, other Atomizers 24 can be used.

Similarly, in the embodiment of the system 10 shown with reference to FIG. 1B, instead of entering the Atomizer 24, the mixture of the return sludge 35 and the at least one reactive gas 37 enters a Cavitation Pump 22. Cavitation is the formation of vapor cavities in a liquid. In pumps, cavitation is caused by an impeller of the pump moving through a liquid, with low-pressure areas being formed as the liquid accelerates and moves past the blades, causing the liquid to vaporize and form small bubbles of gas. While cavitation in most cases is undesirable as damaging to the components of the pump, the Cavitation Pump 22, while subject to the increased wear due to cavitation, takes advantage of the cavitation effect to help dissolve the at least one reactive gas 37 within the return sludge to create gas-dispersion return sludge 36. In particular, the rotation of the impeller of the Cavitation Pump 22 is fast enough to slice the formed bubbles into multiple smaller bubbles, thus forming ultra-fine bubbles of the 1 nm-30,000 nm diameter. The Cavitation Pump 22 operates under a high pressure, which facilitates the dissolution of the at least one reactive gas 37 within the return sludge 35. In one embodiment, the pressure inside the pump 22 is between 0.0981 MPa and 5.394 MPa, though other values of pressure are also possible.

In a still further embodiment, the system 10 could include both the Cavitation Pump 22 and the Atomizer 24, with both the Cavitation Pump 22 and the Atomizer 24 contributing to the creation of the ultra-fine bubbles and creation of the gas-dispersion return sludge 36. The gas-dispersion return sludge 36 is returned solely to Mixer/Distributor 15 and the one or more Aerobic Reaction Vessels 16, and is not returned to Sedimentation Vessel 12, Adjustment Vessel 14, or Sludge Sedimentation Vessel 18. The returned quantity of gas-dispersion return sludge 36 is unitarily controlled and unitarily managed to maximize the sum total reduction of carbon dioxide, the reduction in treatment costs, and the reduction in energy usage of the entire wastewater treatment system. Because the wastewater treatment capacity of the one or more Aerobic Reaction Vessel 16 is dramatically increased, the Aerobic Reaction Vessel 16 can be made very small.

Due to the processing the Atomizer 24 or the Cavitation Pump 22 and being subsequently provided to the one or more Aerobic Reaction Vessels 16, the microbe flora within gas-dispersion return sludge 36 becomes activated by the oxygen (and possibly ozone) that the microbes receive. For example, when the gas-dispersion return sludge enters Aerobic Reaction Vessel 16 (or if the Mixer/Distributor 15 is employed, the Mixer 15), the activated microbes have been brought to a state of extreme near-starvation, so that between their reproductive function and their digestive function, they autonomously prioritize digestion over reproduction. Thus, the provision of the high level of oxygen (or oxygen with the trace of ozone) allows to individually control and manage the reproductive and digestive functions of the microbe colonies, prioritizing the digestive function of the microbes over the reproductive function. In the present application, the term "reproductive function" of the microbe flora is defined as the function by which the microbes absorb as food organic matter contained in wastewater 11, the microbes grow, and then reproduce, such that the organic matter becomes isolated as a mass of matter and microbes, thus purifying the wastewater. The "digestive function" of the microbe colonies is defined as the function by which the microbes absorb as food organic matter contained in wastewater, then break it down and digest it to gain energy which sustains their activity and their life processes.

The high activation of the microorganisms is particularly pronounced when the concentration of oxygen within the Aerobic Reaction Vessel 16 reaches a particular critical threshold, with the presence within the mixed liquor 17 of at least 10% of volume of the gas-dispersion return sludge 36 that has at least 10 mg/l of dissolved oxygen (a level that can be achieved through the use of the Atomizer 24 or the Cavitation Pump 22). Once that threshold is reached, 1DO (mg/l) is enough for breaking down more pollutants than what would be included in 1BOD or 1COD when the dissolved oxygen within the Aerobic Reaction Vessel 16 is at a lower level. At these conditions, the amount of pollutants degraded by the microorganisms within the Aerobic Reaction Vessel 16 has experimentally been shown to exceed 20 times the amount of pollutant degraded by the same microorganism using the same amount of oxygen when the concentration of oxygen is at levels close to those occurring in nature (2-4 (mg/l). At a differing concentration of oxygen, the critical threshold of the gas-dispersion return sludge 36 that needs to be added to the Aerobic Reaction Vessel 16 would change proportionally. The knowledge of this effect can be used to calculate with great precision an amount of the gas-dispersion return sludge 36 that is necessary for purification of a particular amount of wastewater 11, allowing to reduce the amount of unnecessary Excess Sludge 27 produced. Likewise, knowing the volumes of the gas-dispersion return sludge 36 and the volume of wastewater 11 that need to be handled can allow to properly size the components of the system 10, reducing waste and cost of creating the system 10.

As the formation of the ultra-fine bubbles plays an important role in the activation of the microorganisms, additional explanation is provided regarding the formation and use of the bubbles below. Regarding the slowing effect on the velocity at which bubbles rise within a liquid which can be achieved by producing bubbles which are ultra-fine, bubbles with diameter of around 30 µm rise within a liquid at approximately 1 m/hr, and at a diameter of around 1 µm they rise at less than 0.005 m/hr (Stokes' Law for Spherical Bubbles). With this range of velocity, bubbles remain within the liquid for long enough that they can immediately and at the required position replace dissolved oxygen which has been consumed by the biochemical reaction with the pollutant substances in the wastewater to be treated, and furthermore, because the bubbles can be dispersed in ultra-fine bubble form, uniformly and in great quantity, and therefore in the same places where oxygen has been consumed, a bubble storage function is also achieved.

In this way, the desired reactive gases including oxygen or oxygen and ozone can be supplied and stored with extremely long duration, with neither surplus nor shortage, thereby shortening and stimulating the biochemical reaction, and also allowing that the supply within the time period required to carry out the biochemical reaction need not necessarily be continuous but can be intermittent.

As mentioned above, the Atomizer 24 or the Cavitation Pump 22 is employed to disperse gas into liquid in the form of ultra-fine bubbles. To render bubbles to an ultra-fine size and blend the ultra-fine bubbles into liquid, mechanical agitation and cutting are insufficient to achieve the nano level, and only when the velocity of the two-phase flow of the vapor-liquid is increased through pressurization, and a synergistic effect with the vortex churning of the liquid is generated using cavitation and ultrasound, that the bubbles are broken down to ultra-fine state and blended into the mixture as ultra-fine bubbles. For the gas to be dissolved and remain in dissolved state, pressure conditions are of key importance, and higher pressures are known to be more advantageous. Taking all these factors into account, the range of pressure chosen for the Atomizer 24 or the Cavitation Pump 22 is from 0.0981 MPa MPa-5. 394 MPa (1-55 kg/cm$^2$).

In a simple return process for activated sludge (with zero addition of reactive gas), operating in low pressure ranges to avoid destroying the microorganisms which exist in the activated sludge. Further, the reason to strive for the highest pressure that can be practically achieved (approximately 5.5 MPa), is to effectively utilize, in the oxidation and decomposition process of sludge employing reactive gas including high density ozone, a synergistic oxidation and decomposition effect between the actions of cavitation and ultrasound, which under high pressure cause the oxidation and breakdown of ozone itself, and the functioning of O radicals and OH radicals. With the large-capacity wastewater treatment employing the activated sludge method 40 and the system 10, care has been taken to choose frequencies of ultrasound which can be used easily and economically, and so at low pressure ranges a frequency of 20 kHz was chosen, and for high pressure ranges (approximately 5.5 MPa) a frequency of 12,000 kHz was chosen. In a further embodiment, other frequencies in the 20 kHz-12,000 kHz range are possible.

For the Oxygen and Ozone Generator 28, an ozone generator or similar may be used to regulate the supply of oxygen and the generation of ozone. For example, by employing an ozone-generating element comprising an electrode mounted to a dielectric substance, and a high-frequency high-voltage power source which applies a high-frequency alternating current to the ozone-generating element while supplying an oxygen-rich gas to the ozone-generating element, and adjusting the quantity of ozone generated by using a regulator to control the voltage and/or the frequency of the power source, it becomes possible to effect an oxygen/ozone cycle generator which regulates the amount of oxygen and ozone supplied, to cope with fluctuations in the quality and load of sewage for wastewater treatment due to morning, daytime or nighttime, or due to either dry weather or rainy weather, or to cope with processes based mainly on the supply of oxygen and with processes based mainly on oxidation and decomposition by ozone. For the reactive gas including oxygen to be supplied, air, oxygen-enriched air, or pure oxygen are all acceptable. The supplied gas may also be pumped as is, with zero ozone generation. Of course, the operation of the oxygen/ozone cycle generator may also be suspended. Further, while the Oxygen and Ozone generator 28 is represented as a single unit, in a further embodiment, the system 10 could include multiple generators 28, one generator 28 providing ozone and another generator providing oxygen, with the gases provided by both generators being provided into the Return Sludge Pathway 26 to be mixed with the return sludge 35.

In the activated sludge process, the microorganisms which effect the biochemical reaction are returned to the wastewater intake side with a portion of the sludge (return sludge) such that the microorganisms are utilized cyclically. If the wastewater 11 to be treated is wastewater 11 which includes high densities of organic substances, and accelerating the microbial biochemical reaction is therefore necessary, then maximizing the quantity of oxygen dissolved in the wastewater 11 or replenishing dissolved oxygen rapidly according to the amount of dissolved oxygen which is consumed is desirable. The system 10 performs favorably in this respect, employing the Atomizer 24 or the Cavitation Pump 22, to infuse with the required amount of oxygen gas (or oxygen with the trace of ozone) the water which carries the return sludge back to Aerobic Reaction Vessel 16. The microbial biochemical reaction is accelerated dramatically due to the Atomizer 24 or the Cavitation Pump 22 supplying a plentiful amount of oxygen (or oxygen with a trace of ozone) in a dissolved state and in the form of ultra-fine bubbles in an extremely short time.

Because ultra-fine bubbles, as previously described, require a very long time to float to the surface of Aerobic Reaction Vessel 16, during the time which it takes them to float to the surface of Aerobic Reaction Vessel 16, the ultra-fine bubbles in Aerobic Reaction Vessel 16 are dispersed and stored in the form of ultra-fine bubbles, and continuously replenish the dissolved oxygen. By maintaining a high quantity of dissolved oxygen in Aerobic Reaction Vessel 16, significant acceleration of the microbial biochemical reaction becomes possible. Due to the effect of the microbial biochemical reaction within Aerobic Reaction Vessel 16, a portion of the organic matter in the wastewater is digested, releasing carbon dioxide and water, and a portion of the organic matter is consumed by activated sludge microorganisms; the microorganisms multiply, and the activated sludge is generated. In this case, by adding not only oxygen to the wastewater, but by optionally also adding and employing trace amounts (e.g. up to 0.01-0.5 mg/l=ppm) of ozone, greater activation of the microorganisms which carry out the microbial biochemical reaction becomes possible.

In one embodiment, the components of the system 10 described above can be controlled independently of each other. In a further embodiment, the system 10 includes a Controller 39 that is interfaced, such as via a wired or a wireless connections, to at least the Sludge Sedimentation Vessel 20, the Oxygen and Ozone generator 28, and the Atomizer 24 (in the embodiment of the system 10 shown with reference to FIG. 1A) or the Cavitation Pump 22 (in the embodiment of the system 10 shown with reference to FIG. 1B). The Controller 39 can also be similarly interfaced to other components of the system 39. The Controller 39 can receive from a user the amount of gas-dispersion return sludge 36 that is to be delivered to the Aerobic Reaction Vessel 16 and control the Sludge Sedimentation Vessel, the Oxygen and Ozone Generator 28, the Cavitation Pump 22 or the Atomizer 24 to deliver the desired amount of the gas-dispersion return sludge 36. Alternatively, the controller 39 can receive from a user a characteristic of the wastewater treatment, such as a degree of the wastewater treatment desired by the user, a wastewater treatment time desired by the user, and a desired wastewater treatment capacity, and determine the amount of the gas-dispersion return sludge 36 to be delivered to the Aerobic Reaction Vessel 16 to achieve the desired characteristic. The determined amount can then be delivered under the control of the Controller 39. The Controller 39 can be a computing device, such as a personal computer, a smartphone, a laptop, a tablet, though other kinds of computing devices are possible. The Controller 39 can include components conventionally found in general purpose programmable computing devices, such as a central processing unit, memory, input/output ports, network interfaces, and non-volatile storage, although other components are possible. The central processing unit can implement computer-executable code which can be implemented as modules. The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

The Controller 39 can be controlled by a user on-site or remotely. For example, the Controller 39 can be interfaced to an Internetwork, such as the Internet or a cellular network, and a user device (such as a smartphone though other user devices are possible) also interfaced allows to command the Controller 39 remotely, and provides remote control of the system 10 to a user.

Other kinds of the Controller 39 are also possible.

When the system 10 has not recently been ran, there may not always gas-dispersion return sludge 36 available to be added to the Aerobic Reaction Vessel 36 and provide the aerobic microorganisms necessary to conduct the aerobic reaction to the Aerobic Reaction Vessel. In such a situation, the system 10 may utilize seed sludge—sludge 21 that is input into the system 10, such as into the Return Sludge Pipeway 26, from an external source, such as another wastewater treatment system, though other external sources are possible. By being processed by the Atomizer 24 (or the Cavitation Pump 22) and the Oxygen and Ozone Generator 28, the seed sludge is turned into the gas-dispersion return sludge 36 and can then be provided to the Aerobic Reaction Vessel 16 to be used for the treatment of the wastewater 11. As the microorganisms present in activated sludge 21 differ significantly based on the geographic origin of the wastewater 11 from which the sludge 21 is created, the seed sludge introduced into the system 10 is selected based on the geographic location of the wastewater from 21 from the seed sludge originates. Preferably, the seed sludge is from the same or proximate geographic location as the wastewater 11 being processed by the system 10 to avoid an introduction of exogenous microorganisms that can negatively impact the aerobic reaction.

The system 10 can be created from most existing water treatment facilities by retrofitting certain portions of the system 10 onto existing equipment. In particular, the Atomizer 24 or the Cavitation Pump 22, and the oxygen and ozone generator 28 can be retrofitted into an existing wastewater treatment plant, allowing for widespread use of the system 10 and the method described in this application.

As described above, providing the gas-dispersion return sludge 36 allows to exercise increased control over the wastewater purification. In particular, the ratio of the volume of gas-dispersion return sludge 36 to the volume of the wastewater 11 to be treated (and consequently the amount of consumable organic pollutants available to the microorganisms in the gas-dispersion return sludge 36) whether the microorganism exercise exclusively the digestive function, or upon acquiring the necessary energy, in the presence of additional organic pollutants and oxygen, can proceed to also exercise the reproductive function and produce the sludge 21. FIGS. 2A-2B are flow diagrams showing a method 40 for wastewater treatment through controlled microorganism activation in accordance with one embodiment. The method can be implemented using the system 10 of FIG. 1A or 1B. Optionally, if no gas-dispersion return sludge 36 is present in the Aerobic Reaction Vessel at the start of the execution of the method 40, seed sludge is added to the system 10, is converted into gas-dispersion return sludge 36, and is provided into one or more of the Aerobic Reaction Vessels, as described above with reference to FIG. 1 (step 41). The load of wastewater 11 to be treated is determined and the amount of gas-dispersion return sludge 36 to be delivered to the Aerobic Reaction Vessel 16 is determined (step 42). The determination of the amount of the gas-dispersion return sludge 36 can be done based on the load as well as other desired characteristics of the wastewater treatment, such as the degree of the purification and the speed of the treatment, though other characteristics are possible. Another one of the characteristics is whether the goals of the wastewater treatments include only digestion of the organic pollutants via the digestive function or whether some creation of additional sludge 21 is desired. Thus, if the goal of the wastewater treatment is pure digestion of the organic pollutants with creation of minimum to no sludge 21, the ratio of the volume of the gas-dispersion return sludge 36 to the volume of the wastewater 11 is going to be greater than if creation of at least some sludge 21 is desirable. However, as some amount of the sludge 21 is necessary for subsequent purification cycles, the ratio of the volume of the gas-dispersion return sludge 36 to the volume of the wastewater 11 can be decreased, allowing the microorganism to exercise their reproductive function following the satiation of the digestive function. The levels of organic pollutants within a wastewater 11 can vary with time even in the same location. These levels can also vary based on the source of the wastewater 11 (and hence the geographic location from where the wastewater 11 originates). Similarly, the digestive and reproductive abilities of the microorganism flora vary depending on which strains of the microorganisms that make up the flora in the sludge 36, with different strains being present in different geographic regions. Further, the exact levels of dissolved reactive gas within the gas-dispersion return sludge 36 can affect the digestive ability of the microorganisms within the sludge 36 and thus the amount of the sludge 36 required to achieve purification goals. Due to the variabilities associated with the different geographic locations and levels of reactive gases, the optimum amount of sludge for a particular purpose can be determined experimentally, as further described below. For the purpose of eliminating as much as of the organic pollutants as possible while producing minimum amount of sludge, the ratio in the mixed liquor 17 of volume of the gas-dispersion return sludge 36 (having at least 10 mg/l of dissolved oxygen) to the volume of the wastewater 11 of at least 10% has generally proved sufficient.

Optionally, if there is an opportunity for physically setting up or changing the set-up of the equipment used for processing of the wastewater 11 (such as the system of FIG. 11), the parameters of the equipment, such as the size (though other parameters are also possible) determined and optionally implemented (step 43).

The wastewater 11 enters Sedimentation Vessel 12 where grit and other inorganic solids settle and are separated out (step 44). Subsequently, the wastewater 11 enters Adjustment Vessel 14 where the load and conditions of raw sewage 11 are adjusted and solid organic material is solubilized by anaerobic microorganisms (step 45).

Next, the wastewater 11 flows, possibly via a mixer/distributor 15 if one or more of them are part of the system 10, into one or more Aerobic Reaction Vessels 16, where the wastewater 11 (raw sewage) is added to gas-dispersion return sludge 36 and blended to form mixed liquor 17 (if the mixer/distributor is involved, the mixed liquor 17 forms within the mixer-distributor 15 and is provided to the one or more Aerobic Reaction Vessels 16 where the majority of the aerobic biochemical consumption of organic pollutants takes place) (step 46). From there, if any aeration by bubbling using air as a reactive gas was previously performed, such aeration becomes unnecessary due to the reactive gas contained in gas-dispersion return sludge 36. Dissolved oxygen (DO) (possibly with traces of ozone) is supplied to the Vessels 16 by the gas-dispersion return sludge 36 and organic solids left undissolved after step 45 are oxidized; at the same time biochemical treatment by aerobic microbe flora occurs, with the organic pollutant substances dissolved in the wastewater 11 being digested to water ($H_2O$) and carbon dioxide ($CO_2$), and removed, and if the digestive function of the microorganisms has been satisfied and exercise of the reproductive function is possible, immobilized as additional sludge 21 (step 47). Following the completion of the consumption of the organic pollutants via the digestive and possibly the reproductive function, the microorganisms enter the dormant state.

Through the action of the Atomizer 24 or the Cavitation Pump 22, and the Oxygen and Ozone Generator 28, the quantity of dissolved oxygen in gas-dispersion return sludge 36 increases to a critical level (at least 10 mg/l) that activates the microbe flora within the gas-dispersion return sludge 36 from the dormant state. While the microorganism are activated at this point and are ready to digest the organic pollutants (and are prioritizing the digestive function over the reproductive function), the level of the organic pollutants is either at zero (with the organic pollutants having previously been entirely consumed at the one or more Aerobic Reaction Vessels) or close to zero (at a level insufficient to satiate the prioritized digestive function of the microorganisms), and thus the microorganisms are forced into a state of extreme starvation. The activated microbe flora which exists within gas-dispersion return sludge 36 are supplied to Mixer/Distributor 15, if present in the system 10, and the activated microbe is blended with wastewater 11 by the Mixer/Distributor 15 to form the mixed liquor 17, which is supplied to the one or more Aerobic Reaction Vessels 16 (or if the system 10 does not include the Mixer/Distributor 15, the mixed liquor 17 is formed within the Aerobic Reaction Vessel 16). Within the Aerobic Reaction Vessels, the microorganisms continue to autonomously prioritize their digestive function over their reproductive function. The efficiency ratio of oxygen (DO) utilization in the digestive function of the microbe flora becomes extremely heightened. As a result, the activated microbe flora in the one or more Aerobic Reaction Vessels 16, become capable of purifying far more organic matter per 1DO than the typically defined quantity for the activated sludge method of 1BOD or 1COD.

Next, the mixed liquor 17 progresses to Sedimentation Vessel 18, settles inside Sedimentation Vessel 18 and is separated into sludge 21 and supernatant (step 48). The settled sludge 21 is collected in Sludge Storage Vessel 20 (step 49), and is returned to Aerobic Reaction Vessel 16 in the form of gas-dispersion return sludge 36, for cyclical reuse (step 50), as further described below with reference to FIG. 3.

Excess sludge 27 is expelled from the Sludge Storage Vessel 20 and from the system 10 (step 51). Supernatant is also removed as treated water 72, and undergoes further processing at the Treated Water Processing Unit 73 before being expelled from the system as Purified Water 74 (step 52). The sterilization can be performed as described in U.S. Pat. No. 10,287,194, issued May 14, 2019, to Ohki et al., the disclosure of which is incorporated by reference, though other ways to perform the sterilization are possible.

Optionally, the amount of the sludge 21 that is collected in the Sludge Storage Vessel can be measured (such as by weighing the sludge 21), with the results of the measurement being used to adjust the ratio of gas-dispersion return sludge 36 to wastewater 11 used to form the mixed liquor 17 in subsequent repetitions of the method 40 (step 53). For example, if more than a desired amount of sludge 21 was measured, the ratio of the amount of the gas-dispersion return sludge 36 to the amount of the wastewater 11 used to form the mixed liquor 17 can be increased in subsequent runs of the method 40 (thus reducing the overall amount of digestable organic pollutants available to the microorganisms and increasing the probability that all of the organic pollutants will be digested by the microorganisms via the digestion function). Alternatively, if not enough sludge 21 was created, the ratio of the amount of the gas-dispersion return sludge 36 to the amount of the wastewater 11 used to form the mixed liquor 17 can be decreased in subsequent runs of the method 40 (thus increasing the amount of the organic pollutants available to the microorganisms, which, can be used for reproduction of the microorganism following the satiation of the digestive function).

If more wastewater 11 to be treated remains (step 54), whether the amount of solid pollutants, organic and inorganic, in the next batch of wastewater 11 to be treated requires action via execution of steps 44 and 45 is determined (step 55). The determination can be made by comparing the level of the solids to one or more thresholds, though other kinds of determinations are possible. If the level requires action (step 55), the method returns to step 44. If the level does not require action (55), the method 40 returns to step 46. If no more wastewater 11 remains to be processed (step 52), the method 40 ends.

Figure 3:
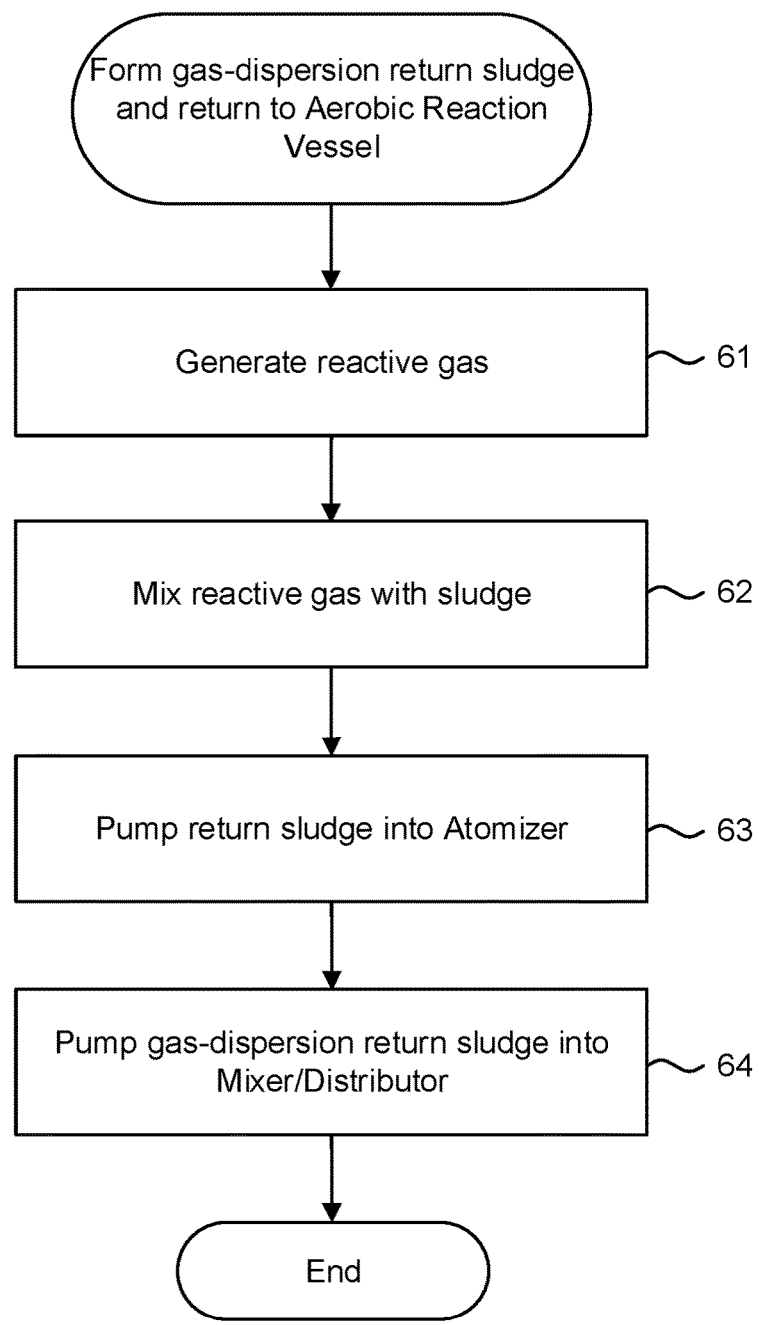
FIG. 3 is a flow diagram showing a routine for forming gas-dispersion return sludge and returning the gas-dispersion return sludge to the aerobic reaction vessel for use in the method of FIG. 2 in accordance with one embodiment.

Providing the gas-dispersion return sludge 36 solely into the one or more Aerobic Reaction Vessels 16, possibly via the Mixer/Distributor 15, allows to achieve an optimum quantity of the aerobic microorganisms within the Aerobic Reaction Vessels 16. FIG. 3 is a flow diagram showing a routine for forming gas-dispersion return sludge and returning the gas-dispersion return sludge 36 to the one or more aerobic reaction vessels 16 for use in the method of FIG. 2 in accordance with one embodiment.

Reactive gas, pure oxygen or oxygen containing trace amounts of ozone, is generated by the Oxygen and Ozone Generator 28 (step 61). As described above, the Atomizer 24 or the Cavitation Pump 22 is installed along the Return Sludge Pipeway 26, and the reactive gas is introduced the return sludge 35 is converted into a gas-liquid mixed liquor upon the addition of the at least one reactive gas (at least the oxygen) to the gas-dispersion return sludge 36 (step 62). When this gas-liquid mixed liquor (sludge) passed through the Atomizer 24 or the Cavitation Pump 22, the reactive gas within the gas-liquid mixed liquor (sludge) is instantaneously rendered into ultra-fine bubbles (bubble diameter less than 30 ideally bubble diameter less than 1 μm) and a portion of it is instantly dissolved (step 63). With this, a super-saturated DO value of 10-40 mg/l is realized (0.01-0.5 mg/L of ozone if ozone is also generated), and the remaining gas is dispersed, immobilized and stored within the sludge in an ultra-fine bubble state, providing a way to replenish the supply of the dissolved reactive gases and continue the digestion of the organic pollutants.

This gas-dispersion return sludge 36 containing reactive gas is supplied by the Atomizer 24 or the Cavitation Pump 22 only to the one or more Aerobic Reaction Vessels 16 (possibly via the Mixer/Distributor 15), where the gas-dispersion return sludge 36 is formed, along with the wastewater 11, part of the mixed liquor 17 (step 64), ending the routine 60.

As mentioned above, upon addition of the gas-dispersion return sludge to one or more of the Aerobic Reaction Vessels 16 that point, any bubbling in the Aerobic Reaction Vessel 16 can be ceased. Or, in cases where the bubbling is required to prevent the settling of sludge, bubbling aeration can be minimal and may be conducted intermittently and for short periods of time.

While the invention has been particularly shown and described as referenced to the embodiments thereof, those skilled in the art will understand that the foregoing and other changes in form and detail may be made therein without departing from the spirit and scope of the invention.

What is claimed is:

1. A method for wastewater treatment through controlled prioritization of microorganism digestion function, comprising:
    providing a return sludge comprising aerobic microorganisms capable of exhibiting at least one of a reproductive function, by which the microorganisms absorb organic pollutants and multiply using the absorbed pollutants, and a digestive function, by which the microorganisms digest the organic pollutants as a source of energy into water and carbon dioxide, wherein the return sludge is substantially free of the organic pollutants and wherein at least a majority of the microorganisms are in a dormant state when provided;
    providing, using a gas generator, at least one reactive gas into the return sludge;
    forming a gas-dispersion return sludge by rendering using one of an atomizer or a cavitation pump the at least one reactive gas into ultra-fine bubbles within the return sludge, wherein a portion of the ultra-fine bubbles dissolves within the return sludge, wherein the at least one dissolved reactive gas activates at least a portion of the dormant microorganisms, and wherein the gas-dispersion return sludge is substantially free of the organic pollutants; and
    forming a mixed liquor by combining the gas-dispersion return sludge with a wastewater that comprises at least some of the organic pollutants, wherein the activated microorganisms prioritize the digestive function over the reproductive function upon encountering the organic pollutants within the wastewater.

2. A method according to claim 1, wherein the at least one reactive gas comprises at least one of oxygen and oxygen with a trace of ozone.

3. A method according to claim 2, wherein the concentration of the dissolved oxygen within the gas-dispersion return sludge is at least 10 mg/l.

4. A method according to claim 3, wherein a volume of the gas-dispersion return sludge is at least 10% of a volume of the wastewater to be treated.

5. A method according to claim 1, wherein the cavitation pump produces the ultra-fine bubbles via cavitation produced by an impeller of the pump.

6. A method according to claim 1, further comprising:
    distributing by a mixer the mixed liquor to one or more aerobic reaction vessels, wherein the microorganisms digest the organic pollutants within the mixed liquor while in the one or more aerobic reaction vessels until the mixed liquor is substantially free of the organic pollutants.

7. A method for wastewater treatment through controlling microorganism purification functions, comprising:
    providing a sludge comprising aerobic microorganisms capable of exhibiting at least one of a reproductive function, by which the microorganisms absorb organic pollutants and multiply using the absorbed pollutants to produce the sludge, and a digestive function by which the microorganisms digest organic pollutants as a source of energy into water and carbon dioxide, wherein the sludge is substantially free of the organic pollutants and wherein at least a majority of the microorganisms are in a dormant state when provided;
    providing, using a gas generator, at least one reactive gas into the sludge;
    forming a gas-dispersion return sludge by rendering using one of an atomizer or a cavitation pump the at least one reactive gas into ultra-fine bubbles within the sludge, wherein a portion of the ultra-fine bubbles dissolves within the sludge, wherein the at least one dissolved reactive gas activates at least a portion of the dormant microorganisms, and wherein the gas-dispersion return sludge is substantially free of the organic pollutants;
    setting an amount of the sludge to be produced by the microorganisms;
    determining a ratio of a volume of wastewater comprising at least some of the organic pollutants to a volume of the gas-dispersion return sludge necessary to produce the amount of the sludge; and
    forming a mixed liquor by combining the gas-dispersion return sludge with the wastewater in accordance with the ratio, wherein the microorganisms prioritize one of the digestive or the reproduction function based on an availability of the organic pollutants in the mixed liquor.

8. A method according to claim 7, wherein the at least one reactive gas comprises one of oxygen and oxygen with a trace of ozone.

9. A method according to claim 8, wherein the concentration of the dissolved oxygen within the gas-dispersion return sludge is at least 10 mg/l.

10. A method according to claim 9, wherein a volume of the gas-dispersion return sludge is at least 10% of a volume of the wastewater to be treated.

11. A method according to claim 7, wherein the cavitation pump produces the ultra-fine bubbles via cavitation produced by an impeller of the pump.

12. A method according to claim 7, further comprising:
    distributing by a mixer the mixed liquor to one or more aerobic reaction vessels, wherein the microorganisms consume the organic pollutants via at least one of the digestive and the reproduction function within the mixed liquor while in the one or more aerobic reaction vessels until the mixed liquor is substantially free of the organic pollutants.

13. A method according to claim 7, wherein the ratio is determined based on experimental data.

14. A method according to claim 13, wherein the ratio depends on one or more of an identity of one or more strain of the microorganisms, a concentration of the gas-dispersion return sludge, and a concentration of the organic pollutants within the wastewater.

15. A method for optimization of wastewater treatment through controlling microorganism purification functions, comprising:
providing a sludge comprising aerobic microorganisms capable of exhibiting at least one of a reproductive function, by which the microorganisms absorb organic pollutants and multiply using the absorbed pollutants to produce the sludge, and a digestive function by which the microorganisms digest organic pollutants as a source of energy into water and carbon dioxide, wherein the sludge is substantially free of the organic pollutants and wherein at least a majority of the microorganisms are in a dormant state when provided;
providing, using a gas generator, at least one reactive gas into the sludge;
forming a gas-dispersion return sludge by rendering using one of an atomizer or a cavitation pump the at least one reactive gas into ultra-fine bubbles within the sludge, wherein a portion of the ultra-fine bubbles dissolves within the sludge, wherein the at least one dissolved reactive gas activates at least a portion of the dormant microorganisms, and wherein the gas-dispersion return sludge is substantially free of the organic pollutants;
forming a mixed liquor by combining a volume of the gas-dispersion return sludge with a volume of the wastewater;
pumping the mixed liquor into a sludge sedimentation vessel and separating the mixed liquor into a supernatant and the sludge; and
measuring an amount of the sludge separated from the mixed liquor, wherein a ratio of the gas-dispersion return sludge to the wastewater is adjusted in forming further batches of the mixed liquor based on the amount of the sludge separated from the mixed liquor.

16. A method according to claim 15, wherein the at least one reactive gas comprises one of oxygen and oxygen with a trace of ozone.

17. A method according to claim 16, wherein the concentration of the dissolved oxygen within the gas-dispersion return sludge is at least 10 mg/l.

18. A method according to claim 17, wherein a volume of the gas-dispersion return sludge is at least 10% of a volume of the wastewater in the mixed liquor.

19. A method according to claim 17, wherein the cavitation pump produces the ultra-fine bubbles via cavitation produced by an impeller of the pump.

20. A method according to claim 15, further comprising:
distributing by a mixer the mixed liquor to one or more aerobic reaction vessels, wherein the microorganism consume the organic pollutants via at least one of the digestive and the reproduction function within the mixed liquor while in the one or more aerobic reaction vessels until the mixed liquor is substantially free of the organic pollutants.

\* \* \* \* \*